United States Patent [19]
Masuda

[11] Patent Number: 5,023,863
[45] Date of Patent: Jun. 11, 1991

[54] OPTICAL SWITCHING SYSTEM

[75] Inventor: Shigefumi Masuda, Yokohama, Japan

[73] Assignee: Fujitsu Limited, Kawasaki, Japan

[21] Appl. No.: 381,595

[22] Filed: Jul. 18, 1989

[30] Foreign Application Priority Data

Jul. 18, 1988 [JP] Japan .................. 63-178512

[51] Int. Cl.$^5$ .................. H04J 14/00; H04J 14/02
[52] U.S. Cl. .................. 370/1; 370/3
[58] Field of Search .................. 370/1, 3, 4, 50, 70

[56] References Cited

FOREIGN PATENT DOCUMENTS

| 66487 | 4/1983 | Japan . | |
|---|---|---|---|
| 0158661 | 9/1984 | Japan | 370/1 |
| 96893 | 5/1986 | Japan . | |
| 0184997 | 8/1986 | Japan | 370/3 |
| 0050194 | 3/1988 | Japan | 370/4 |
| 0220688 | 9/1988 | Japan | 370/4 |
| 0011493 | 1/1989 | Japan | 370/4 |
| 0042934 | 2/1989 | Japan | 370/1 |
| 0090696 | 4/1989 | Japan | 370/3 |

OTHER PUBLICATIONS

Odagawa et al., "All Optical Flip-Flop Operation of Bistable Laser Diode", Conference on Solid State Devices and Materials, Aug. 1988 Merely Shows an Example of an Optical Memory.
Kuno et al., "Study on the Wavelength-Switching Devices Using Bistable DFB Lasers", National Conference of Semiconductor/Materials Group of Electronics and Information Communication Society, 1987.
Kondo et al., "A Tunable Optical-Wavelength Conversion Laser with TM-Polarized Light Input", National Conference of Electronics and Information Communication Society, Fall 1988 show examples of Optical Frequency Shifters.
Tomita et al., "An Experiment on Ultra-High Speed Optical Memory Operation Using Bistable Laser Diode", National Conference of Electronics and Communication Society, 1985.
Tomita et al., "2 Gb/s Ultra High Speed Optical Memory Using a Bistable Laser Diode", National Conference of Electronics and Information Communication Society, 1987 relate to Optical Memories.
Kikushima et al., "Tunable Amplification Properties of LD", National Conference of Electronics and Communication Society, 1985.
Terakado et al., "Light Amplification Using Bistable Laser Diode", National Conference of Electronics and Communication Society, 1985 relate to Amplification of Optical signals.

Primary Examiner—Reinhard J. Eisenzopf
Assistant Examiner—L. Van Beek
Attorney, Agent, or Firm—Staas & Halsey

[57] ABSTRACT

An optical switching system receives an optical input signal which is a wavelength-division multiplexed and time-division multiplexed signal. The optical input signal is divided into time-division multiplexed optical signals in different wavelength regions and transferred within an optical data bus after being subjected to a predetermined process including a frequency shift. The optical signals in the different wavelength regions are extracted from the optical data bus using optical bandpass filters, and multiplexed into an output optical signal which is a wavelength-division multiplexed and time-division multiplexed signal after being subjected to a predetermined process including a frequency shift.

29 Claims, 13 Drawing Sheets

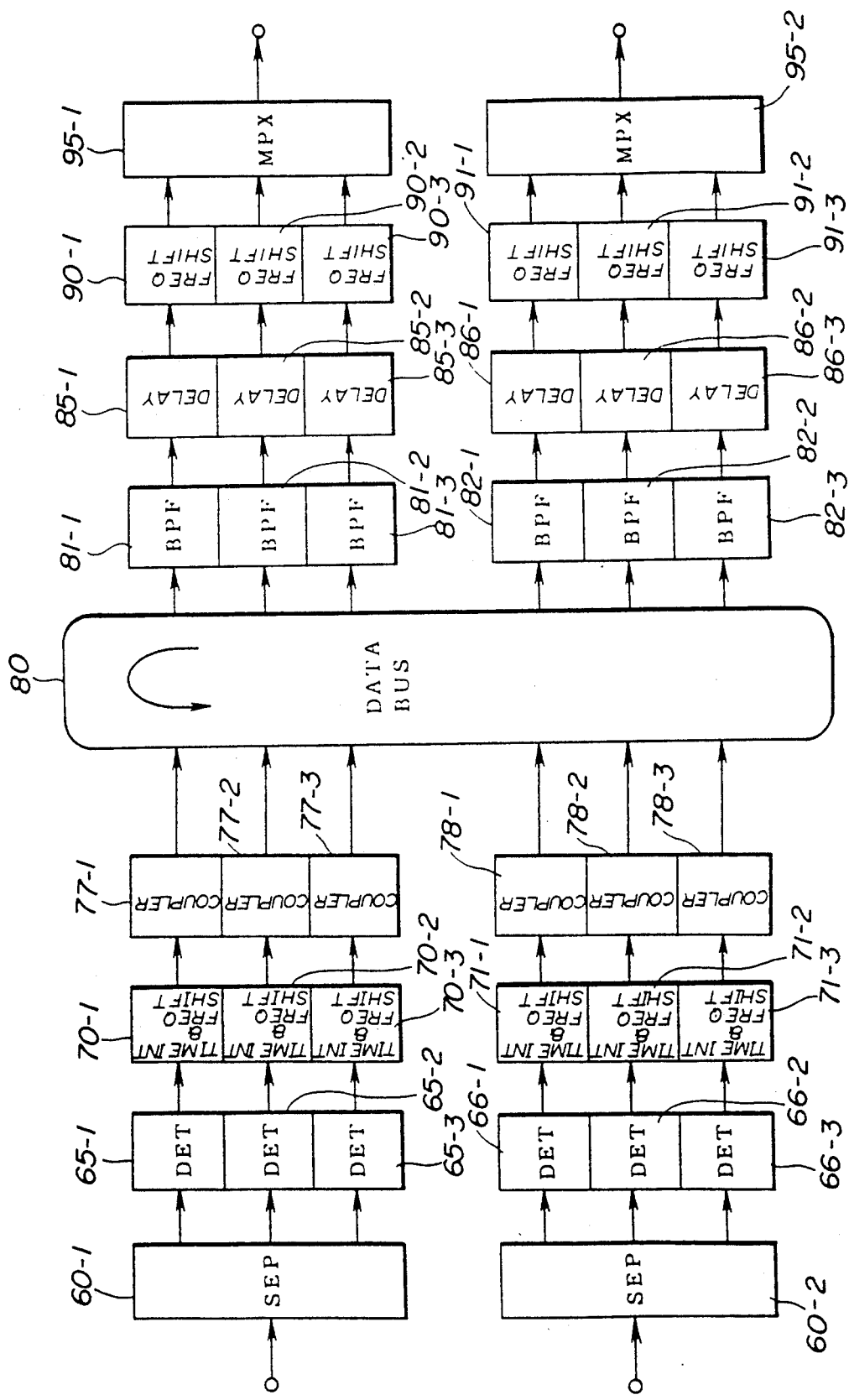

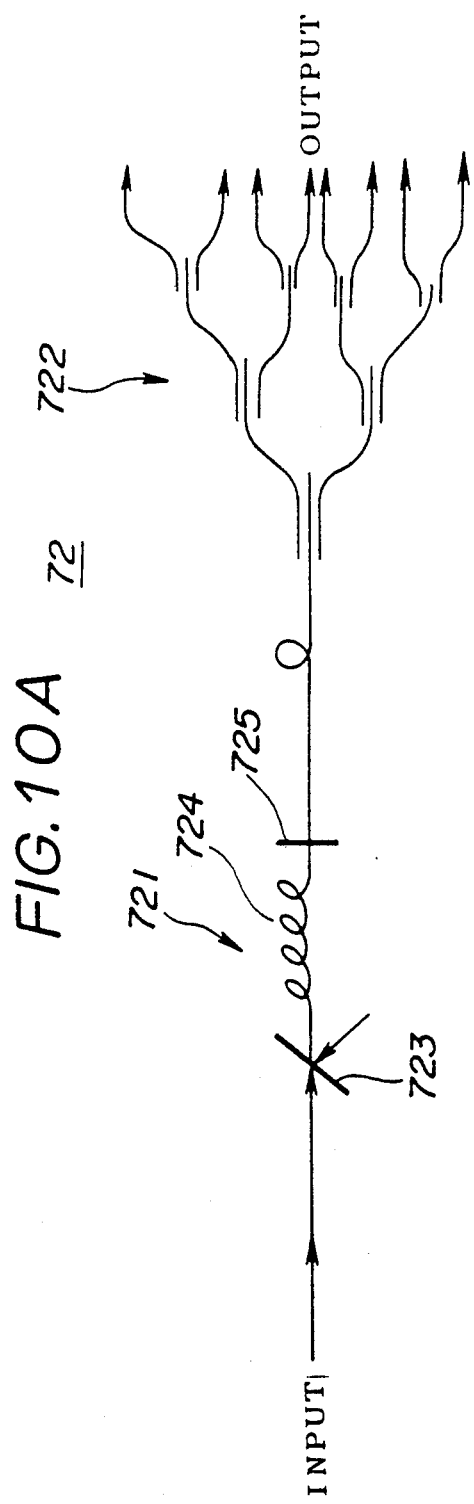
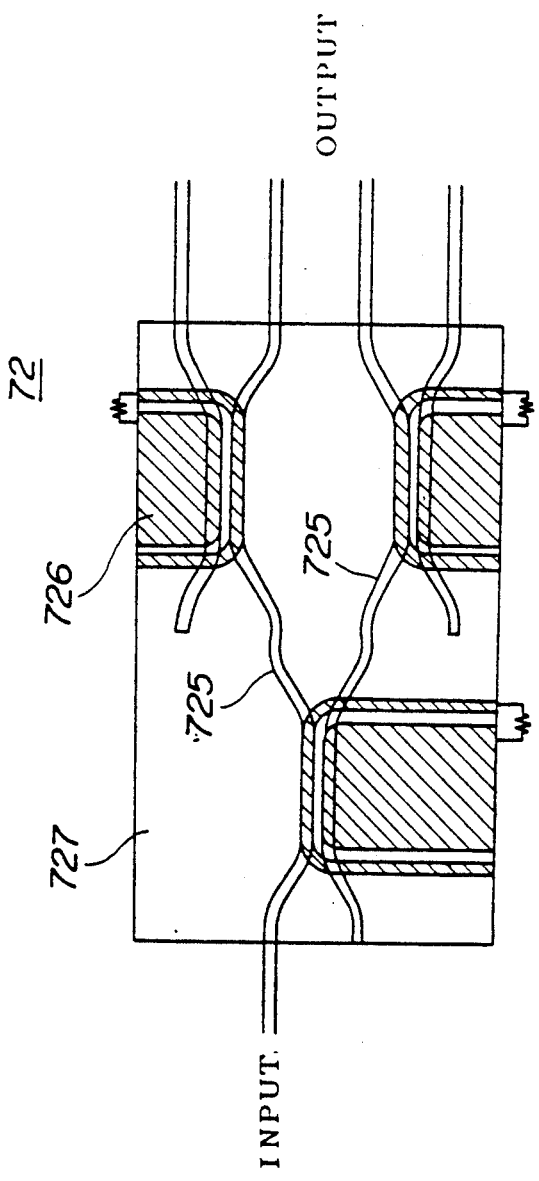
FIG.10A
FIG.10B

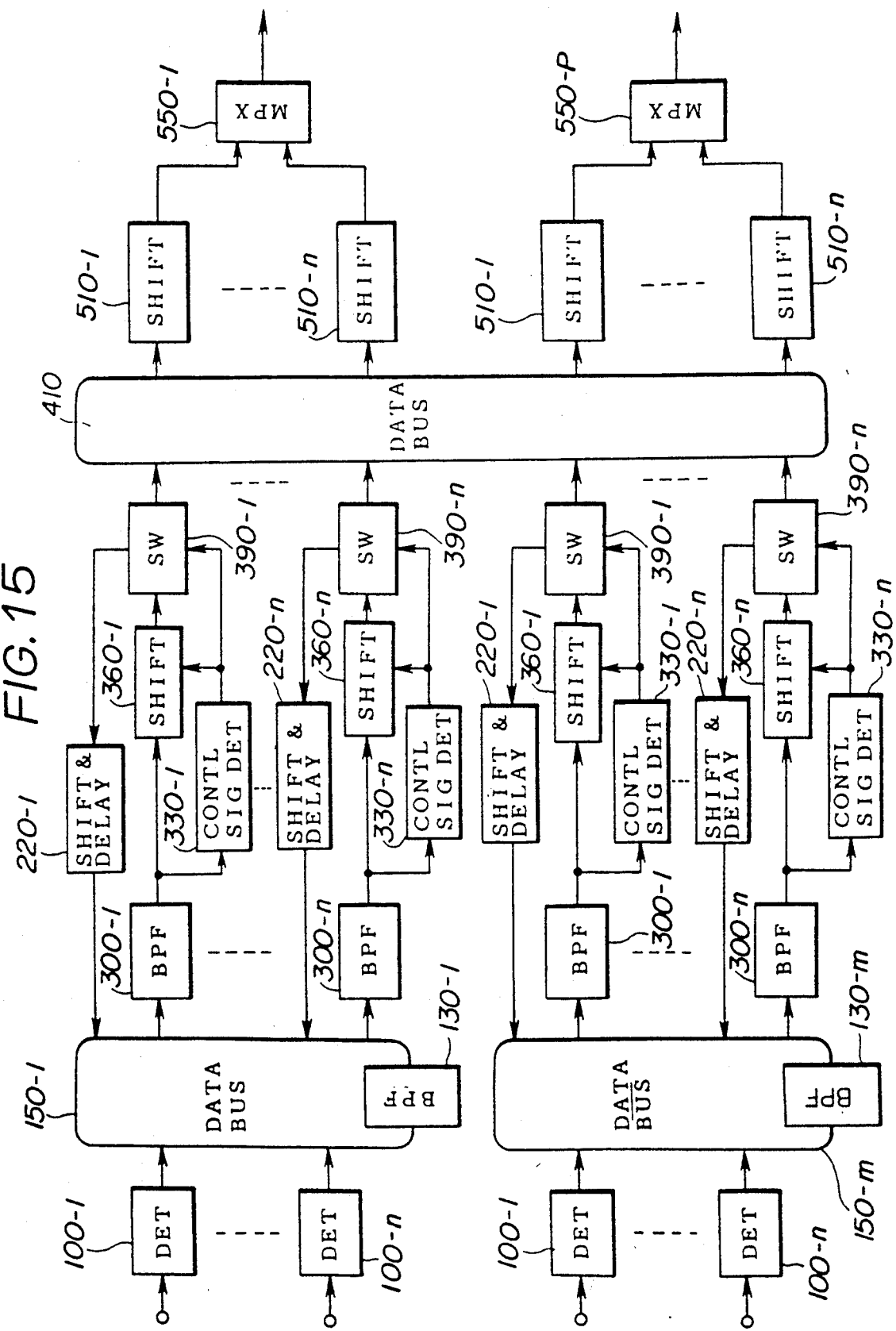

OPTICAL SWITCHING SYSTEM

BACKGROUND OF THE INVENTION

The present invention generally relates to optical switching systems, and more particularly to an optical switching system used in an optical fiber communication and the like.

Various information interchange services such as a video conference system and a high definition television system are being realized using optical information networks such as integrated services digital networks (ISDNs). An optical switching system is used for making these information interchange services.

A conventional optical switching system employs a wavelength-division and time-division composite switch as a basic switch for a wavelength-division and time-division composite optical communication path. The wavelength-division and time-division composite switch is capable of arbitrarily interchanging the wavelength and time slot of an input optical signal which is a wavelength-division multiplexed and time-division multiplexed signal.

FIG. 1 shows a basic structure of the wavelength-/time composite switch in an example of the conventional optical switching system. An optical input signal which is applied to a variable branching filter 1 is a wavelength-division multiplexed (wavelengths of $\lambda_1$ through $\lambda_n$) and time-division multiplexed signal. The variable branching filter 1 branches the input optical signal to k optical where k is an integer greater than or equal to one, for every predetermined wavelength. In addition, the selecting wavelength of the variable branching filter 1 is switched for every time slot of the time-division multiplexed signal component. Outputs of the optical T switches 2 are converted into predetermined wavelengths for every time slot in variable wavelength converting elements 3. Outputs of the variable wavelength converting elements 3 are combined and output as an optical output signal of the wavelength-/time composite switch.

FIG. 2 shows an equivalent circuit of the wavelength/time composite switch shown in FIG. 1. As shown in FIG. 2, n time division highways, where n is an integer greater than or equal to one, of the wavelengths $\lambda_1$ through $\lambda_n$ are coupled to k T switches 2' via an nxk S-switch 4. Outputs of the T switches 2' are coupled to n time division highways of the wavelengths $\lambda_1$ through $\lambda_n$ via a kxn S-switch 5.

FIG. 3 shows a more detailed block diagram of the conventional optical switching system. A variable branching filter 1" branches a reference light in which a light having an accurate wavelength is wavelength-division multiplexed. The wavelength conversion is made by modulating outputs of the variable branching filter 1" in optically controlled optical modulators 3' depending on outputs of optical T-switches 2". By switching the selecting wavelengths of the variable branching filter 1" for every time slot, it is possible to also vary the wavelength for every time slot after the wavelength conversion.

The input optical signal which is a wavelength-division multiplexed and time-division multiplexed signal is conventionally subjected to the arbitrary interchange of the wavelength and the time slot in the above described manner. However, the conventional optical switching system is not practical in that it lacks flexibility in the interchange of information contents, collection of required information and the like, and a highly satisfactory service cannot be expected when applied to the information interchange services.

SUMMARY OF THE INVENTION

Accordingly, it is a general object of the present invention to provide a novel and useful optical switching system in which the problems described above are eliminated.

Another and more specific object of the present invention is to provide an optical switching system comprising first means for receiving an input optical signal which is a wavelength-division multiplexed and time-division multiplexed signal. The first means includes first separating means for separating and outputting a time-division multiplexed signal component of the input optical signal in each of divided wavelengths and second separating means for separating a control information included in the input optical signal. Second means is coupled to the first means for storing an optical signal output from the first means for every time slot identical to that used for the separation in the first means and for reading out stored optical signals successively in a sequence of predetermined time slots so as to convert wavelengths of the optical signals into predetermined wavelengths. Third means is coupled to the second means for multiplexing wavelengths of optical signals output from the second means into wavelength-division multiplexed optical signals and for delaying a phase of the wavelength-division multiplexed optical signals by a predetermined quantity. An optical data bus is coupled to the third means for receiving optical signals output from the third means and for transferring the optical signals in a predetermined direction within the optical data bus. Fourth means is coupled to the optical data bus for extracting optical signals having wavelengths belonging to predetermined wavelength regions from the optical data bus and delaying a phase of the extracted optical signals a predetermined quantity and for converting wavelengths of the extracted optical signals into predetermined wavelengths. Fifth means is coupled to the fourth means for multiplexing the wavelengths of the optical signals output from the fourth means so as to output an output optical signal which is a wavelength-division multiplexed and time-division multiplexed signal. According to the optical switching system of the present invention, the wide frequency band of the optical transmission path is effectively utilized thereby making it possible to realize a high-speed transmission of only the required information such as still image, dynamic image, and high definition image. In addition, it is possible to realize a switching system by an all-optical processing.

Still another object of the present invention is to provide an optical switching system comprising a plurality of detecting means for receiving an input optical signal which is a wavelength-division multiplexed signal and for detecting a control information included in the input optical signal. A plurality of first optical buses are coupled to the detecting means for transferring optical signals output from the detecting means in a predetermined direction within the respective first optical data buses. A plurality of optical bandpass filters are coupled to each of the first optical data buses for extracting optical signals in predetermined wavelength regions based on the control information. Control information detecting means is coupled to the optical bandpass filters for detecting a control information included in the optical signals output from the optical bandpass filters. First shift means is coupled to the optical bandpass filters for delaying phases of the optical signals output from the optical bandpass filters by a predetermined quantity and for shifting wavelengths of the optical signals a predetermined quantity determined by the control information output from the control information detecting means. Switching means is coupled to the first shift means for outputting the optical signals output from the first shift means to one of first paths and second paths responsive to the control information output from the control information detecting means. A second optical data bus is coupled to the first path of the switching means for transferring the optical signals output from the switching means in a predetermined direction within the second optical data bus. Shift and delay means are coupled to the second path of the switching means for receiving predetermined wavelength components of the optical signals output from the switching means determined by the control information output from the control information detecting means and for shifting wavelengths and delaying the predetermined wavelength components. The shift and delay means outputs optical signals corresponding to the shifted and delayed predetermined wavelength components to the respective first optical data buses. Second shift means is coupled to the second optical data bus for extracting optical signals having wavelengths belonging to predetermined wavelength regions from the second optical data bus and for shifting wavelengths of the extracted optical signals a predetermined quantity determined by the control information output from the control information detecting means. Multiplexing means is coupled to the second shift means for multiplexing the wavelengths of the optical signals output from the fourth means so as to output an output optical signal which is a wavelength-division multiplexed. According to the optical switching system of the present invention, the wide frequency band of the optical transmission path is effectively utilized thereby making it possible to realize a high-speed transmission of only the required information such as s still image, dynamic image, and high definition image. In addition, it is possible to realize a switching system using all-optical processing.

Other objects and further features of the present invention will be apparent from the following detailed description when read in conjunction with the accompanying drawings.

BRIEF DESCRIPTION OF THE DRAWINGS

FIG. 5 is a system block diagram showing the first embodiment in more detail;

FIGS. 10A and 10B are diagrams of embodiments of a time-division multiplexed signal separator;

FIG. 15 is a system block diagram for generally explaining a second embodiment of the optical switching system according to the present invention;

DESCRIPTION OF THE PREFERRED EMBODIMENTS

Figure 1:
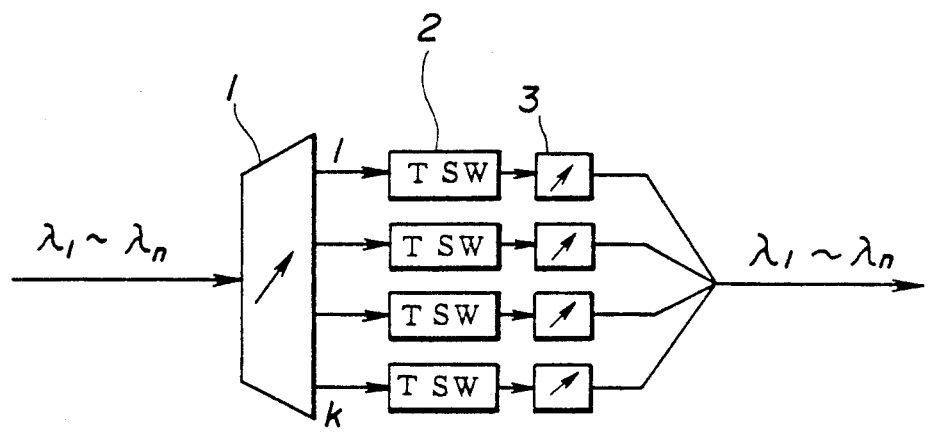
FIG. 1 is a system block diagram showing an example of a conventional optical switching system.
Figure 2:
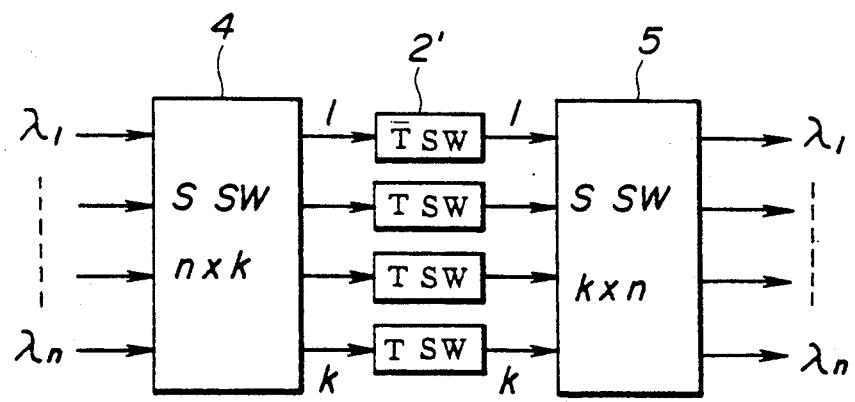
FIG. 2 is a system circuit diagram showing an equivalent circuit of the conventional optical switching system shown in FIG. 1.
Figure 3:
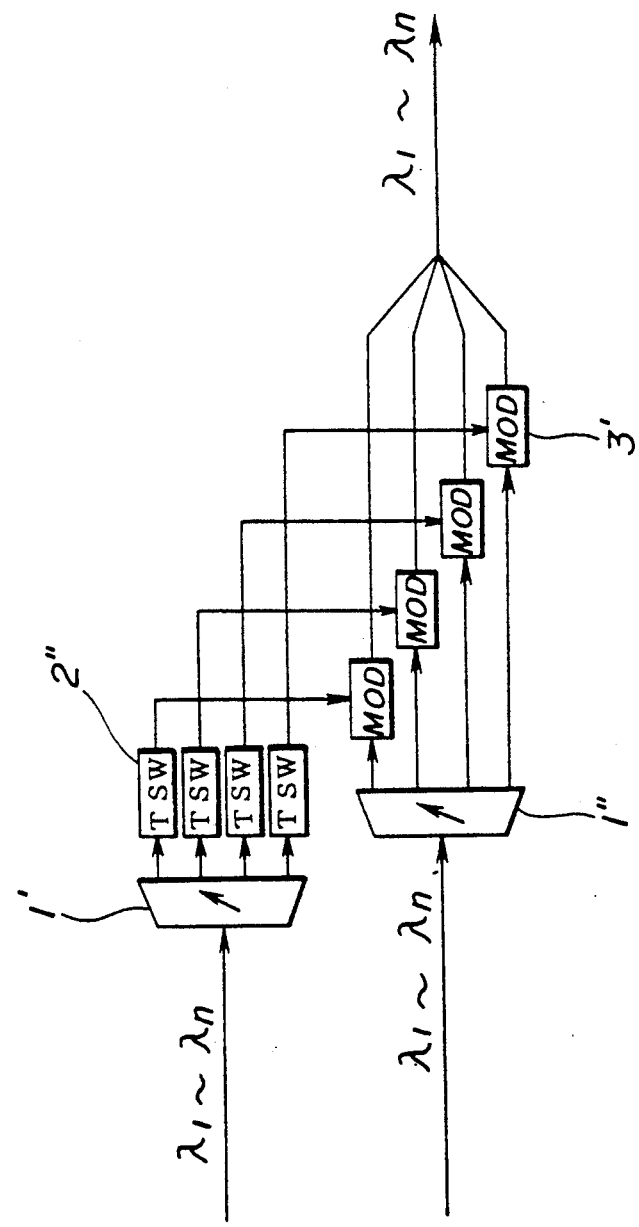
FIG. 3 is a system block diagram showing the conventional optical switching system shown in FIG. 1 in more detail.
Figure 4:
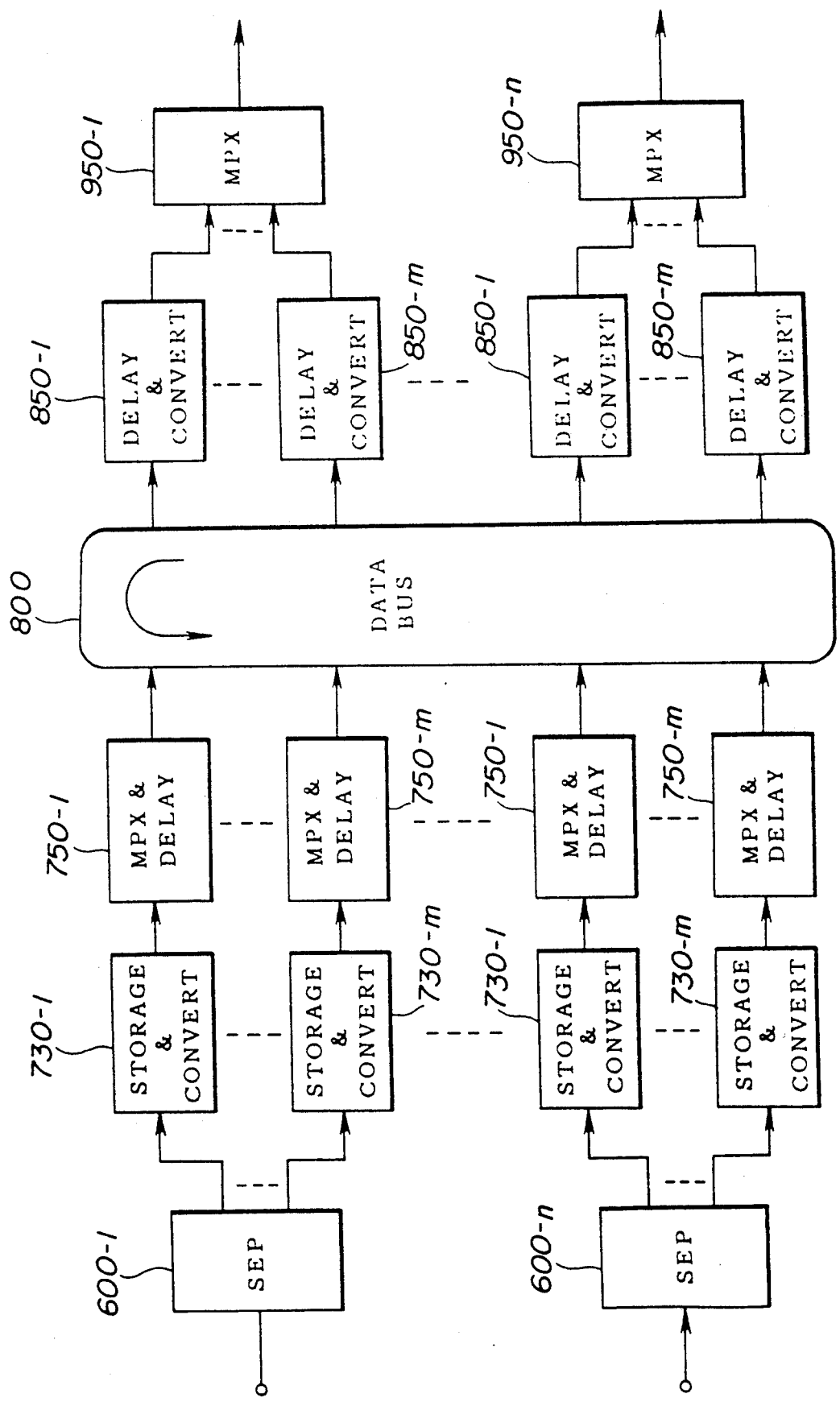
FIG. 4 is a system block diagram for generally explaining a first embodiment of an optical switching system according to the present invention.

FIG. 4 is a first embodiment of an optical switching system according to the present invention. In FIG. 4, wavelength-division multiplexed signal separators 600-1 through 600-n each enter an input optical signal which is a wavelength-division multiplexed and time-division multiplexed signal and separate a time-division multiplexed signal component in each of the divided wavelengths. After separation of the time-division multiplexed signal component, the wavelength-division multiplexed signal separators 600-1 through 600-n each read a control information included in the input optical signal and output an optical signal corresponding to the time-division multiplexed signal component.

Optical storage and wavelength converters 730-1 through 730-m are coupled to each of the wavelength-division multiplexed signal separators 600-1 through 600-n and store optical signals output from the wavelength-division multiplexed signal separators 600-1 through 600-n for every time slot identical to that used for the separation in the wavelength-division multiplexed signal separators 600-1 through 600-n. The optical storage and wavelength converters 730-1 through 730-m read out the stored optical signals successively in a sequence of predetermined time slots and convert the wavelengths of the optical signals to predetermined wavelengths based on the control information.

Optical multiplexer and delay parts 750-1 through 750-m each multiplex the wavelengths of an output optical signal of the corresponding one of the optical storage and wavelength converters 730-1 through 730-m and output the optical signal after delaying the phase of the optical signal a predetermined quantity An optical bus 800 enters output optical signals of the optical multiplexer and delay parts 750-1 through 750-m and transfer these optical signals in a predetermined direction in an optical transmission path. In this embodiment, the optical transmission path is a loop-shaped path.

Optical delay and wavelength converters 850-1 through 850-m are coupled to the optical bus 800 and each extract an optical signal having wavelengths belonging to a predetermined wavelength region and delay the phase thereof a predetermined quantity so as to convert the wavelengths of the optical signal into predetermined wavelengths.

Optical wavelength multiplexers 950-1 through 950-n are each coupled to the optical delay and wavelength converters 850-1 through 850-m and multiplex the wavelengths of the optical signal so as to output an optical output signal which is a wavelength-division multiplexed and time-division multiplexed signal As a result, the output optical signal is obtained with a space multiplexing factor n, a wavelength multiplexing factor m and a time multiplexing factor m. The optical output signal of the optical switching system has a signal format approximately the same as that of the original optical input signal. In other words, the alignment of the optical wavelength, the center wavelength, the wavelength bandwidth and the like of the input optical signal and the output optical signal of the optical switching system are approximately the same.

FIG. 5 shows the first embodiment in more detail. An optical input signal which is a wavelength-division multiplexed and time-division multiplexed signal is obtained from a plurality of channels. For the sake of convenience, FIG. 5 shows a case where there are two channels.

Figure 6:
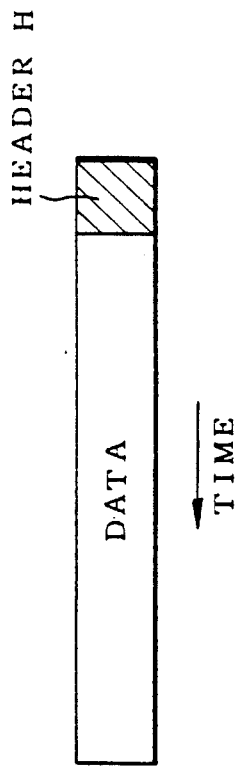
FIG. 6 shows a data structure of an optical input signal.

The optical input signal is made up of cells having a fixed length and a header H as shown in FIG. 6. The header H contains information such as a wavelength information $\lambda_1$ of an optical input signal, a content information $A_1$, a wavelength information $\lambda_2$ of an optical output signal, an output channel information $a_2$, an information quantity $l_1$, a priority information $\rho$, and a time slot information $t_2$, and may be described as $H(\lambda_1, A_1, \lambda_2, a_2, l_1, \rho, t_2, \ldots)$. The wavelength information $\lambda_2$ includes $\lambda_{21}, \lambda_{22}, \lambda_{23}, \ldots$. The output channel information $a_2$ includes $a_{21}, a_{22}, a_{23}, \ldots$, and may be used for making a broadcast. The time slot information $t_2$ includes $t_{21}, t_{22}, t_{23}, \ldots$.

For example, the optical input signal received from a first channel CH1 is applied to an optical wavelength-division multiplexed signal separator (frequency divider) 60-1 wherein time-division multiplexed data are separated from the optical input signal in each of the divided wavelengths. Output optical signals of the optical wavelength-division multiplexed signal separator 60-1 are supplied to detectors 65-1 through 65-3 which detect a control information included in the optical signals. This control information is used to control time slot interchange and frequency shifters 70-1 through 70-3.

Figure 7:
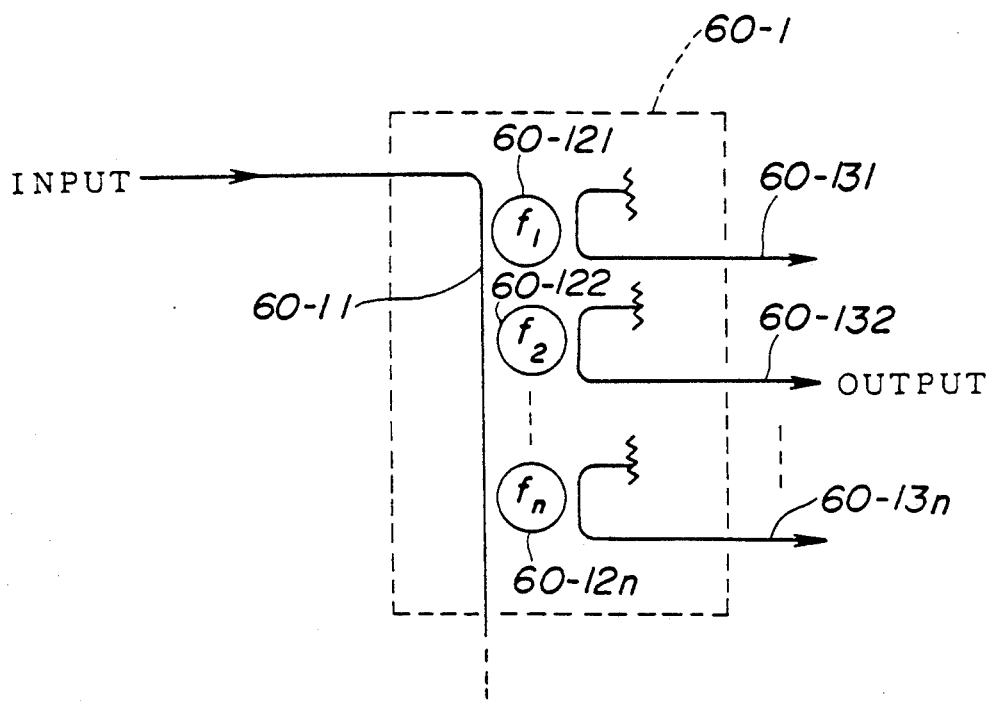
FIG. 7 is a diagram of an embodiment of a wavelength-division multiplexed signal separator.

The optical wavelength-division multiplexed signal separator 60-1 has a structure shown in FIG. 7. The optical wavelength-division multiplexed signal separator 60-1 has an optical fiber 60-11, ring optical resonators 60-121 through 60-12n respectively having a center optical frequency $f_i$ ($i=1, 2, \ldots, n$ and $n=3$ in this embodiment), and optical fibers 60-131 through 60-13n. Each ring optical resonator 60-12i is optically coupled to the optical fiber 60-11 and the corresponding optical fiber 60-13i.

Figure 8A:
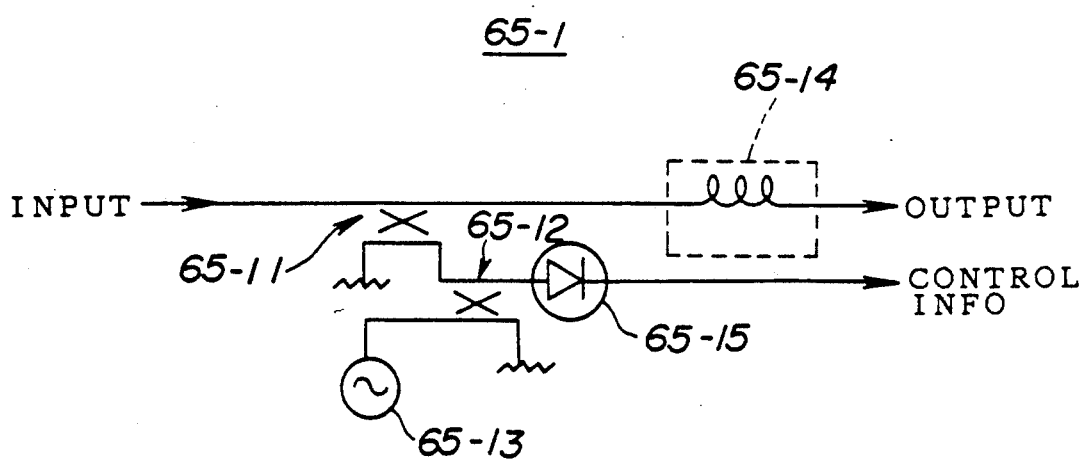
FIGS. 8A through 8C are diagrams of embodiments of a detector according to the present invention.
Figure 8:
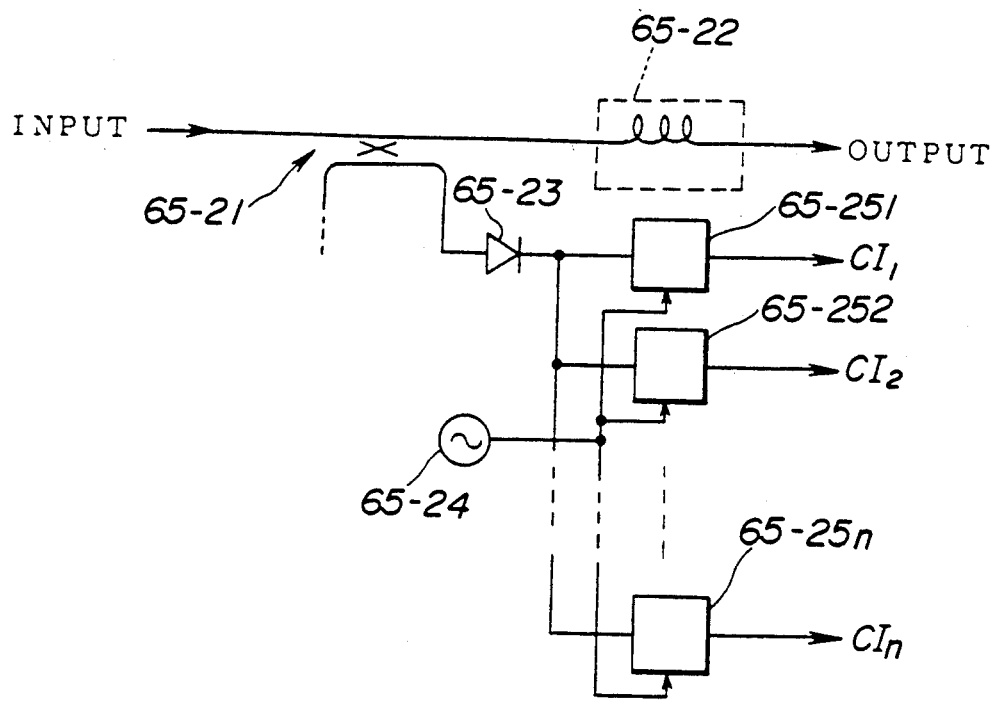
Figure 8:
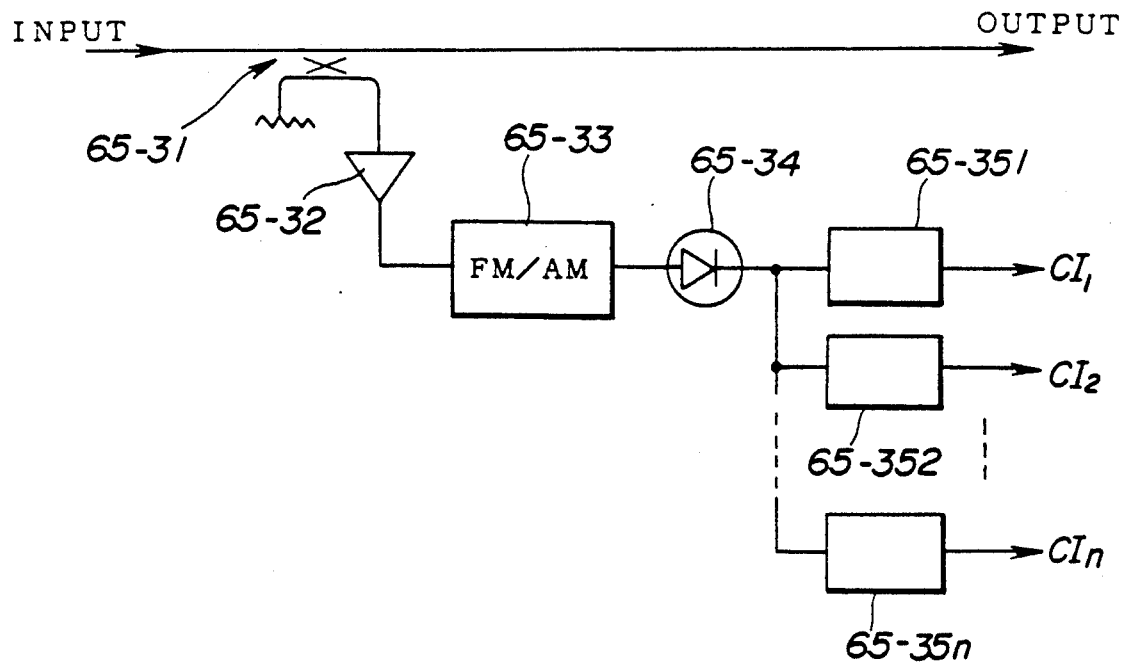

Each of the detectors 65-1 through 65-3 have a structure shown in FIGS. 8A, 8B or 8C. In FIG. 8A, the detector 65-1 has optical couplers 65-11 and 65-12, an optical local oscillator 65-13, an optical delay circuit 65-14, and a photodetector 65-15. The optical signal from the optical wavelength-division multiplexed signal separator 60-1 is output via the optical delay circuit 65-14. On the other hand, the control information is extracted by the optical local oscillator 65-12 and is output from the photodetector 65-15 in the form of an electrical signal.

In FIG. 8B, the detector 65-1 has an optical coupler 65-21, an optical delay circuit 65-22, a photodetector 65-23, a local oscillator 65-24, and electrical tuners 65-251 through 65-25n. The optical signal from the optical wavelength-division multiplexed signal separator 60-1 is output via the optical coupler 65-21 and the optical delay circuit 65-14. On the other hand, a portion of the optical signal (for example, 1/10 the optical power) is branched by the optical coupler 65-21 and supplied to the photodetector 65-23. The electrical tuners 65-251 through 65-25n respectively detect the modulation frequency of the header of the optical signal responsive to an output of the local oscillator 65-24 and output control information $CI_1$ through $CI_n$.

In FIG. 8C, the detector 65-1 has an optical coupler 65-31, an optical amplifier 65-32, an FM/AM converter 65-33, a photodetector 65-34, and electrical filters 65-351 through 65-35n having mutually different passbands. The optical signal from the optical wavelength-division multiplexed signal separator 60-1 is output via the optical coupler 65-31. On the other hand, the optical signal is branched by the optical coupler 65-31 and is supplied to the FM/AM converter 65-33 via the optical amplifier 65-32. For example, a known semiconductor optical amplifier may be used as the optical amplifier 65-32. For example, the FM/AM converter 65-33 comprises a known element which passes an optical signal having a predetermined wavelength. Thus it is possible to convert a frequency modulated (FM) optical signal into an amplitude modulated (AM) optical signal. The output optical signal of the FM/AM converter 65-33 is converted into an electrical signal in the photodetector 65-34, and the electrical signal is supplied to the electrical filters 65-351 through 65-35n which respectively output control information $CI_1$ through $CI_n$.

Figure 9:
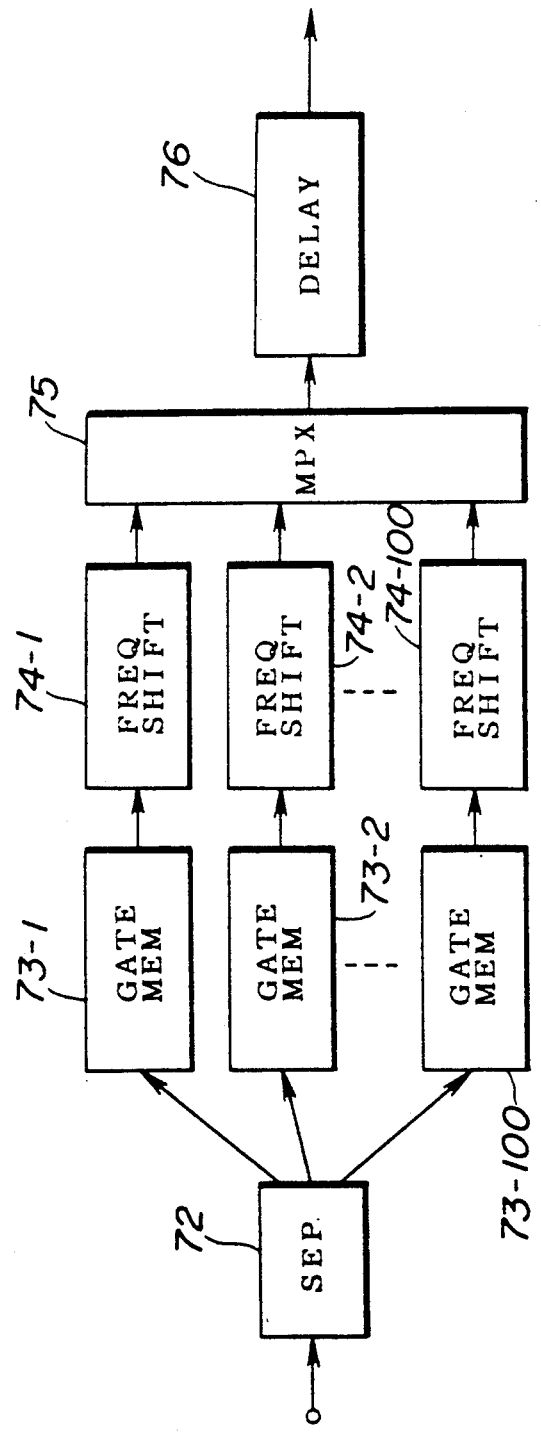
FIG. 9 is a system block diagram showing an embodiment of a time slot interchange and frequency shifter used in the first embodiment.

Output optical signals of the detectors 65-1 through 65-3 are supplied to the corresponding time slot interchange and frequency shifters 70-1 through 70-3. Each of the time slot interchange and frequency shifters 70-1 through 70-3 have a structure shown in FIG. 9. The time slot interchange and frequency shifter comprises a time-division multiplexed signal separator 72, optical gate memories 73-1 through 73-100, optical frequency shifters 74-1 through 74-100, a wavelength multiplexer 75, and an optical delay circuit 76. In the embodiment shown in FIG. 9, the time-division multiplexed signal separator 72 separates 100 time-division multiplexed signals from the output optical signal of one of the detectors 65-1 through 65-3. The time-division multiplexed signal separator 72 functions differently from the optical wavelength-division multiplexed signal separator 60-1 or 60-2 in that the separator 72 merely provides branching of the same signal. An output optical signal or optical packet of the time-division multiplexed signal separator 72 is successively supplied and stored in the optical gate memories 73-1 through 73-100 in this sequence during mutually different time slots. The optical data stored in the optical gate memories 73-1 through 73-100 are read out based on the control information described above and supplied to the corresponding optical frequency shifters 74-1 through 74-100 which convert the wavelengths of the input optical signals into mutually different wavelengths.

Output optical signals of the optical frequency shifters 74-1 through 74-100 are supplied to the wavelength multiplexer 75 wherein a wavelength multiplexing takes place. A wavelength-division multiplexed optical signal output from the wavelength multiplexer 75 is supplied to the optical delay circuit 76 which compensates for a phase error caused by different input positions of the optical signals to the optical bus 80. An output optical signal of the optical delay circuit 76 is supplied to the optical bus 80 via a corresponding one of optical couplers 77-1 through 77-3. Hence, the optical signal from the optical delay circuit 76 is transferred in a predetermined direction in the optical bus 80.

The time-division multiplexed signal separator 72 has a structure shown in FIGS. 10A and 10B. In FIG. 10A, the time-division multiplexed signal separator 72 has an optical amplifier 721 and a star branch part 722. The optical amplifier 721 includes a semi-transparent mirror 723 which receives a light for optical pumping, an Er doped fiber 724, and an optical filter 725. In FIG. 10B, the time-division multiplexed signal separator 72 has optical fibers 725 and electrodes 726 provided on a chip 727. The output optical signal of the time-division multiplexed signal separator 72 is controlled responsive to a control signal applied to the electrodes 726.

A known optical memory may be used for the optical gate memories 73-1 through 73-100. For example, it is possible to employ an all optical flip-flop proposed by Odagawa et al., "All Optical Flip-Flop Operation of Bistable Laser Diode", *Extended Abstracts of the 20th (1988 International) Conference on Solid State Devices and Materials, The Japan Society of Applied Physics.*

Figure 11:
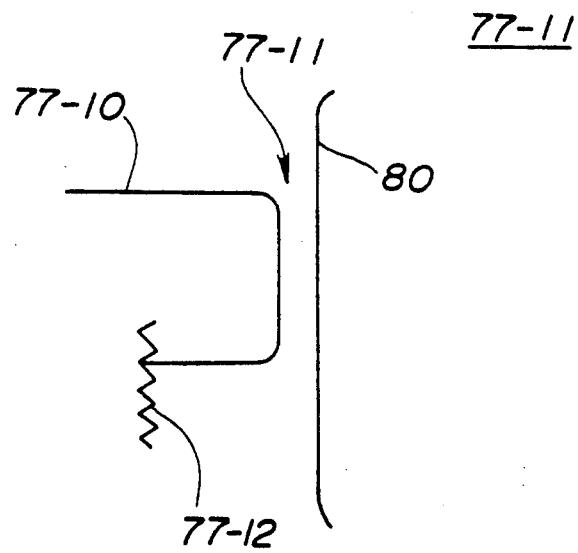
FIG. 11 is a diagram of an embodiment of an optical amplifier.

Each of the optical couplers 77-1 through 77-3 have a structure shown in FIG. 11. In FIG. 11, the optical coupler 77-1 has an optical fiber 77-10 which is optically coupled to the optical data bus 80 at a portion 77-11. One end of the optical fiber 77-10 is connected to an absorbing part 77-12 which absorbs the optical signal transferred within the optical fiber 77-10.

In addition, a known optical frequency shifter may be used for the optical frequency shifters 74-1 through 74-100. For example, it is possible to employ a wavelength conversion element proposed in Kuno et al., "Study on the Wavelength-Switching Devices Using Bistable DFB Lasers", *National Conference of Semiconductor/Materials Group of Electronics and Information Communication Society*, 1987, or a wavelength conversion element proposed in Kondo et al., "A Tunable Optical-Wavelength Conversion Laser with TM-Polarized Light Input", *National Conference of Electronics and Information Communication Society*, Fall 1988.

Returning now to the description of FIG. 5, optically coupled bandpass filters 81-1 through 81-3 each output an optical signal which is obtained from the optical bus 80 and has a wavelength in a vicinity of a center wavelength thereof, that is, a wavelength within a predetermined wavelength range. Optical signals output from the optically coupled bandpass filters 81-1 through 81-3 are supplied to corresponding optical delay circuits 85-1 through 85-3 wherein a phase error compensation similar to that described above takes place. A known optical delay element may be used for the optical delay circuits 85-1 through 85-3. Optical signals output from the optical delay circuits 85-1 through 85-3 are supplied to corresponding optical frequency shifters 90-1 through 90-3 wherein the wavelengths of the optical signals are returned to the original wavelengths. Optical signals output from the optical frequency shifters 90-1 through 90-3 are supplied to a wavelength multiplexer 95-1 which multiplexes the wavelengths of the optical signals. An output optical signal of the wavelength multiplexer 95-1 is transferred to an optical fiber (not shown), for example.

Figure 12:
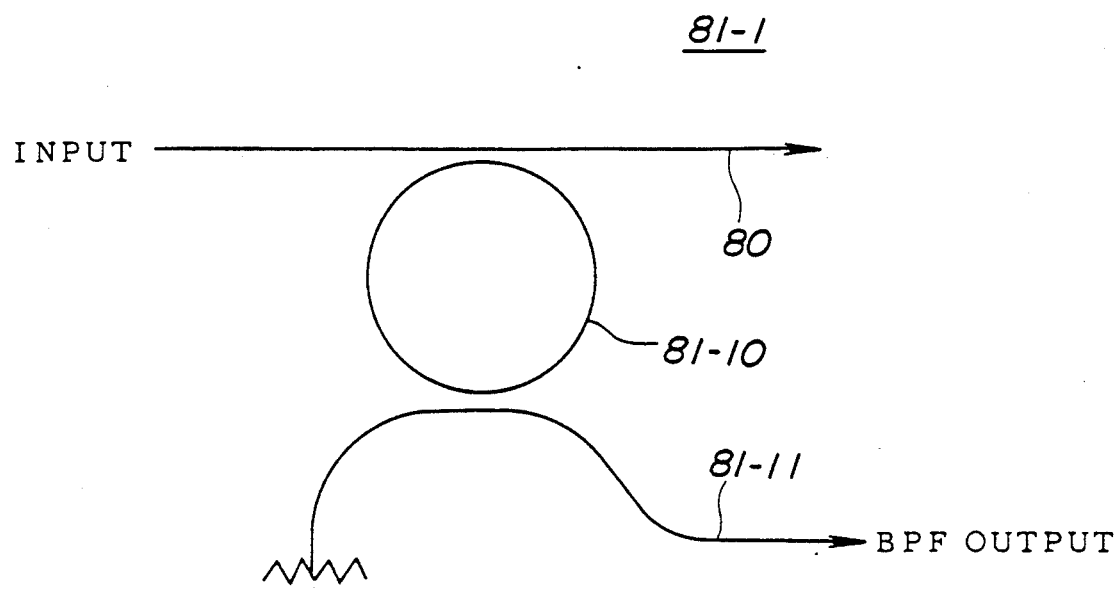
FIG. 12 is a diagram of an embodiment of an optically coupled bandpass filter.

Each of the optically coupled bandpass filters 81-1 through 81-3 have a structure shown in FIG. 12. In FIG. 12, the optically coupled bandpass filter 81-1 has a ring optical resonator 81-10 and an optical fiber 81-11. The ring optical resonator 81-10 is optically coupled to the optical data bus 80 and the optical fiber 81-11. The optical fiber 81-11 transfers the passed optical signal to the corresponding optical delay circuit 81-1.

Figure 13:
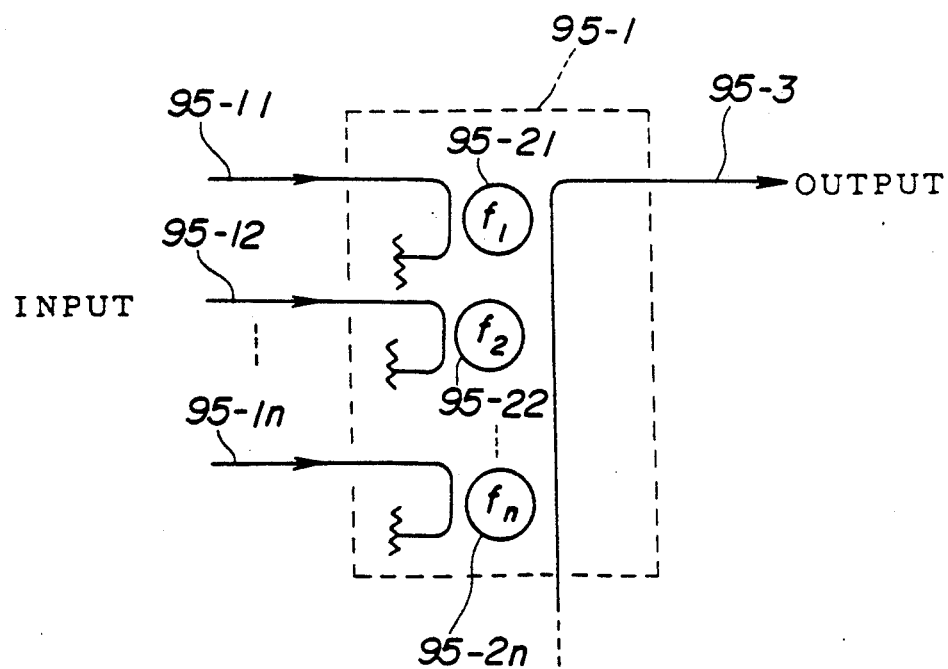
FIG. 13 is a diagram of an embodiment of a wavelength multiplexer.

The wavelength multiplexer 95-1 has a construction shown in FIG. 13. The wavelength multiplexer 95-1 has optical fibers 95-11 through 95-1n, ring optical resonators 95-21 through 95-2n respectively having a center optical frequency $f_i$ ($i = 1, 2, \ldots, n$ and $n = 3$ in this embodiment), and an optical fiber 95-3. Each optical resonator 95-2i is optically coupled to the corresponding optical fiber 95-li and the optical fiber 95-3.

The optical input signal received from a second channel CH2 is processed similarly to the optical input signal received from the first channel CH1. For this reason, a description of an optical wavelength-division multiplexed signal separator 60-2, detectors 66-1 through 66-3, time slot interchange and frequency shifters 71-1 through 71-3, optical couplers 78-1 through 78-3, optically coupled bandpass filters 82-1 through 82-3, optical delay circuits 86-1 through 86-3, optical frequency shifters 91-1 through 91-3, and a wavelength multiplexer 95-2 will be omitted.

Figures 14A, 14B:
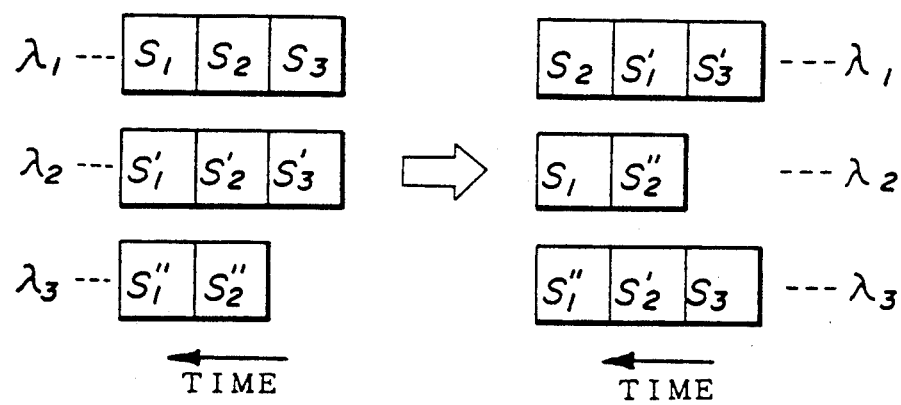
FIGS. 14A and 14B respectively are diagrams showing the input optical signal and an output optical signal of the first embodiment.

FIGS. 14A and 14B respectively show the input optical signal and the output optical signal of the first embodiment. In FIG. 14A, signals S1, S2 and S3 are time-division multiplexed to a wavelength $\lambda_1$ of the input optical signal, signals S1', S2' and S3' are time-division multiplexed to a wavelength $\lambda_2$ of the input optical signal, and signals S1", S2" and S3" are time-division multiplexed to a wavelength $\lambda_3$ of the input optical signal. In FIG. 14B, signals S2, S1' and S3' are time-division multiplexed to the wavelength $\lambda_1$ of the input optical signal, signals S1' and S2" are time-division multiplexed to the wavelength $\lambda_2$ of the input optical signal, and signals S1", S2' and S3 are time-division multiplexed to the wavelength $\lambda_3$ of the input optical signal.

When it is assumed that the optical input signal received by the optical switching system shown in FIG. 5 has a multiplexing factor (a, b, c), where a denotes a number of input optical fibers, b denotes a number of optical frequencies which are multiplexed and c denotes a time-division multiplexing factor, the optical output signal of the optical switching system has the same multiplexing factor (a, b, c). In other words, in FIG. 5, the optical input signal to the optical switching system is divided into b optical frequencies in each of the optical wavelength-division multiplexed signal separators 60-1 through 60-a, where a = 2 and b = 3 in FIG. 5. The b optical frequencies from the optical wavelength-division multiplexed signal separator 60-1, for example, are supplied to the corresponding b detectors 65-1 through 65-b wherein a routing information is extracted.

The routing information includes the number a of output optical fibers of the optical switching system, the number b of optical frequencies output from the optical switching system and a time-division slot address (time slot number) c at the time of output. When the routing information is extracted in the detectors 65-1 through 65-b, the optical signal is stored in the optical gate memories 73-1 through 73-c (c=100 in FIG. 9) of the control time slot interchange and frequency shifters 70-1 through 70-b for the time c which is in conformance with the time slot number c. The stored optical signals are read out in the sequence of the time slot number c.

The optical signals stored in the optical gate memories 73-1 through 73-c may be read out at the same time, but no problems are introduced thereby. This is because the optical frequencies of the optical signal are all converted in the c optical frequency shifters 74-1 through 74-c shown in FIG. 9 so as to carry out a routing in conformance with the extracted routing information. The optical frequency shifters 74-1 through 74-c are optical frequency converters. The optical frequencies are converted as shown in the following Table 1. In the Table 1, a subscript "111" means that the 111th optical frequency (which is an optical frequency only used within the optical switching system) is assigned to the optical signal. In this case a=1, b=1 and c=1. A subscript "112" is adjacent to the 111th optical frequency and only the value of c differs by "1". In other words, the number of optical fibers and the optical frequencies at the time of output are the same as those at the time of input, but the time slot number c increases by "1".

TABLE 1

| | | | | |
|---|---|---|---|---|
| $H_{111}$ | $H_{112}$ | $H_{113}$ | ... | $H_{11c}$ |
| $H_{121}$ | $H_{122}$ | $H_{123}$ | ... | $H_{12c}$ |
| $H_{131}$ | $H_{132}$ | $H_{133}$ | ... | $H_{13c}$ |
| . | . | . | | . |
| . | . | . | | . |
| . | . | . | | . |
| $H_{1b1}$ | $H_{1b2}$ | $H_{1b3}$ | ... | $H_{1bc}$ |
| . | . | . | | . |
| . | . | . | | . |
| . | . | . | | . |
| $H_{a11}$ | $H_{a12}$ | $H_{a13}$ | ... | $H_{a1c}$ |
| $H_{a21}$ | $H_{a22}$ | $H_{a23}$ | ... | $H_{a2c}$ |
| $H_{a31}$ | $H_{a32}$ | $H_{a33}$ | ... | $H_{a3c}$ |
| . | . | . | | . |
| . | . | . | | . |
| . | . | . | | . |
| $H_{ab1}$ | $H_{ab2}$ | $H_{ab3}$ | ... | $H_{abc}$ |

The routing information is included in a portion of the header H shown in FIG. 6. In other words, the header H includes the routing information of the above Table 1. The header H additionally includes an information instructing a broadcasting of the same information, a priority of the information, the size (length) of the information and the like. For example, when the header H includes the information instructing the broadcasting of the same information, the optical gate memory 73-1 for example is not only opened during one time slot but is opened during a number of time slots to send the information a plurality of times to output a plurality of optical signals (a', b', c'), (a", b", c"), (a, b, c), .... In other words, the same information is transferred for the number a' of optical fibers, the number b' of optical frequencies and the time slot number c. In the case of the information having a high priority, it is, for example, possible to give priority to the information over other information by assigning a small number to a portion of the number "abc".

Next, a description will be given of a second embodiment of the optical switching system according to the present invention, by referring to FIG. 15. A description will first be given of the general principle of this embodiment in conjunction with FIG. 15A more detailed description on each of the elements forming the optical switching system will be given later in conjunction with FIG. 16.

In FIG. 15, detectors 100-1 through 100-n each receive an optical input signal which is a wavelength-division multiplexed signal and detect a control signal included in the optical input signal. The optical input signals from the detectors 100-1 through 100-n are then supplied to a corresponding one of first optical buses 150-1 through 150-m via optical couplers (not shown). The optical input signals are transferred in a predetermined direction in a corresponding optical transmission path. In this embodiment, the optical transmission path is a loop-shaped path.

Optical bandpass filters 130-1 through 130-m are respectively inserted in the corresponding first optical buses 150-1 through 150-m and pass optical signals in predetermined wavelength regions which are determined by the control signals separated in the detectors 100-1 through 100-n. Optically coupled bandpass filters 300-1 through 300-n are coupled to each of the first optical buses 150-1 through 150-m and pass optical signals in predetermined wavelength regions. Control signal detectors 330-1 through 330-n are coupled to outputs of the corresponding optically coupled bandpass filters 300-1 through 300-n and detect the control signals included in the optical signals.

First wavelength shifters 360-1 through 360-n are also coupled to the outputs of the corresponding optically coupled bandpass filters 300-1 through 300-n. The first wavelength shifters 360-1 through 360-n each delay the phase of the optical signal a predetermined quantity and shift the wavelength of the optical signal a predetermined quantity which is determined by the control signal detected by the corresponding one of the control signal detectors 330-1 through 330-n. Optical switches 390-1 through 390-n are coupled to outputs of the corresponding first wavelength shifters 360-1 through 360-n and selectively output optical signals to a second optical bus 410 via an optical coupler (not shown) or to a corresponding wavelength shifter and delay parts 220-1 through 220-n depending on the control signals received from the control signal detectors 330-1 through 330-n. The optical input signals received from the optical switches 390-1 through 390-n are transferred in a predetermined direction in a corresponding optical transmission path. In this embodiment, the optical transmission path is a loop-shaped path.

Outputs of the wavelength shifter and delay parts 220-1 through 220-n are coupled to the corresponding first optical buses 150-1 through 150-m via optical couplers (not shown). These wavelength shifter and delay parts 220-1 through 220-n only receive predetermined wavelength components determined by the output control signals of the corresponding control signal detectors 330-1 through 330-n. Each of the wavelength shifter and delay parts 220-1 through 220-n shift the wavelength of the received optical signal a predetermined quantity and delay the shifted optical signal a predetermined quantity before outputting the shifted optical signal to the corresponding one of the first optical buses 150-1 through 150-n.

Second wavelength shifters 510-1 through 510-n are coupled to the second optical bus 410. The second wavelength shifters 510-1 through 510-n respectively receive from the second optical bus 410 optical signals having wavelengths within predetermined wavelength regions. Each of the second wavelength shifters shift the wavelength of the received optical signal a predetermined quantity determined by the output control signal of the corresponding one of the control signal detectors 330-1 through 330-n. Each optical wavelength multiplexer 550-1 through 550-p are coupled to outputs of the second wavelength shifters 510-1 through 510-n and subject the optical signal to a wavelength-division multiplexing.

As a result, a wavelength-division multiplexed optical signal (n waves) is obtained with a space multiplexing factor p. The optical output signal of the optical switching system has a signal format approximately the same as that of the original optical input signal. In other words, the wavelength bandwidth, the center frequency, the time multiplexing factor and the like of the input optical signal and the output optical signal of the optical switching system are approximately the same.

Next, a description will be given of the second embodiment in more detail by referring to FIG. 16. For the sake of convenience, it will be assumed that an optical input signal which is a wavelength-division multiplexed and time-division multiplexed signal having wavelengths $\lambda_1$ through $\lambda_5$ is obtained from a channel CH1 via an optical fiber (not shown) and received by a detector 10-1. The detector 10-1 detects a control information A included in the optical input signal. This control information A is within the header H described before in conjunction with FIG. 6. The control information A is transferred to a subscriber and used for various control including a control of optical buses which will be described later. The detector 10-1 may have the same construction as the detector 65-1 described before.

An output optical signal of the detector 10-1 is supplied to an optical data bus 15-1 via a directional optical coupler 11-1. The directional optical coupler 11-1 may have the same construction as the optical coupler 77-1 described before. The optical signal is transferred in a predetermined direction within the optical data bus 15-1 which has a loop shape in this embodiment. The optical signal which is attenuated during the transfer within the optical data bus 15-1 is amplified in an optical amplifier 12 which is inserted in the optical data bus 15-1. For example, a laser diode is used for the optical amplifier 12. In addition, an optical bandpass filter 13 is inserted in the optical data bus 15-1. The optical bandpass filter 13 is controlled by the control information A so as to pass the optical wavelengths which transmit the desired information.

The optical signal which has passed through the optical bandpass filter 13 is supplied from the optical data bus 15-1 to a directional optical coupler 31-1 via a directional optical bandpass filter 30-1 which has the functions of a directional optical coupler and an optical bandpass filter (wavelength $\lambda_1$ in this case). The optical signal is branched in the directional optical bandpass filter 30-1 and supplied to an optical delay circuit 35-1 on one hand and supplied to a directional optical coupler 32-1 on the other.

An output optical signal (for example, wavelength $\lambda$ of 1.3 $\mu$m) of an optical local oscillator 34-1 is supplied to another input of the directional optical coupler 32-1 so as to carry out a heterodyne detection with the output optical signal of the directional optical coupler 31-1. An output optical signal of the directional optical coupler 31-1 is supplied to a photodetector 33-1 which outputs an electrical signal corresponding to the control information A.

The detectors 10-1 through 10-5 detect the control information A by generally detecting the signal information quantity, for example. The photodetector 33-1 also outputs the control information A but the directional optical couplers 31-1 and 32-1 and the photodetector 33-1 cooperate to read the header information of the optical signal for each optical frequency. Hence, the control information A obtained from the photodetector 33-1 includes the routing information, the information instructing the broadcasting of the same information and the like.

On the other hand, the optical delay circuit 35-1 delays the optical signal a predetermined time (for example, $10^{-1}$ ms) corresponding to a processing time of the processor. The optical delay circuit 35-1 supplies a delayed optical signal to an optical frequency shifter 36-1 so as to shift the wavelength of the optical signal a predetermined shift quantity responsive to the control information A. The optical frequency shifter 36-1 may have the same construction as the optical frequency shifter 74-1 described before. An output optical signal of the optical frequency shifter 36-1 is amplified in an optical amplifier 37 and supplied to an optical modulator 38-1. For example, a laser diode is used for the optical amplifier 37. In order to improve the accuracy of the optical signal, the optical signal is modulated again in the optical modulator 38-1. An output optical signal of the optical modulator 38-1 is supplied to an optical switch 39-1 which is switched responsive to the control information A.

Figure 17:
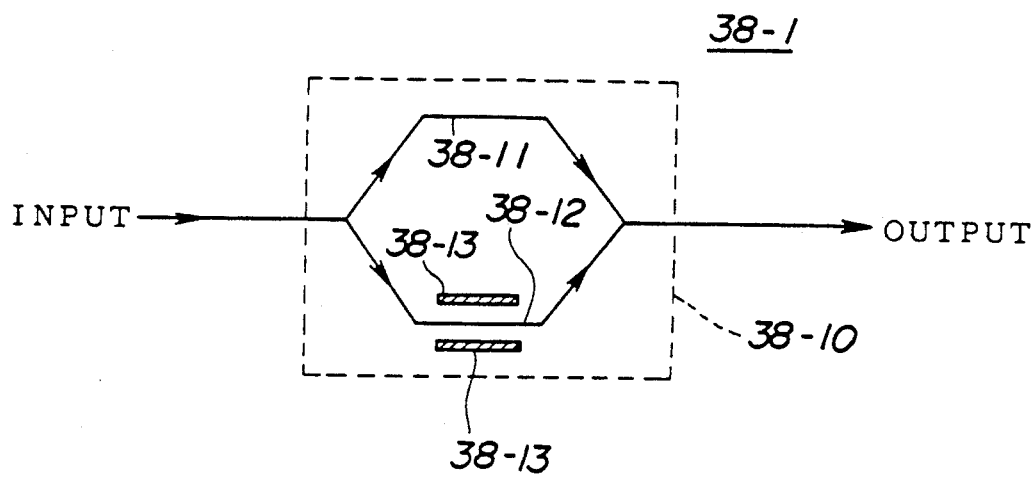
FIG. 17 is a diagram of an embodiment of an optical modulator.

The optical modulator 38-1 has a construction shown in FIG. 17. The optical modulator 38-1 has a substrate 38-10, a pair of waveguides 38-11 and 38-12 formed on the substrate 38-10, and a pair of electrodes 38-13 which sandwich the waveguide 38-12. By applying a control voltage to the electrodes 38-13, the optical signal passing through the waveguide 38-12 becomes delayed with respect to the optical signal passing through the waveguide 38-11, and the optical signal supplied to the optical modulator 38-1 is subjected to an intensity modulation and output as a modulated optical signal. It is possible to carry out a phase modulation by simply omitting the waveguide 38-11.

Figure 18:
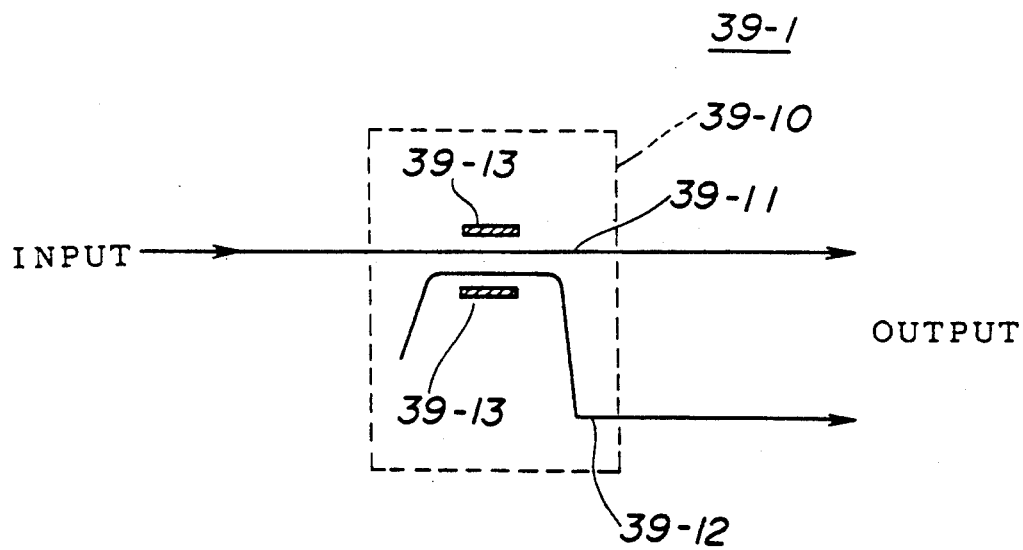
FIG. 18 is a diagram of an embodiment of an optical switch.

The optical switch 39-1 has a construction shown in FIG. 18. The optical switch 39-1 has a substrate 39-10, a pair of waveguides 39-11 and 39-12 formed on the substrate 39-10, and a pair of electrodes 39-13 provided at a branching portion of the waveguides 39-11 and 39-12. By applying a control voltage to the electrodes 39-13, it is possible to selectively pass the incoming optical signal to a selected one of the waveguides 39-11 and 39-12.

Figure 16:
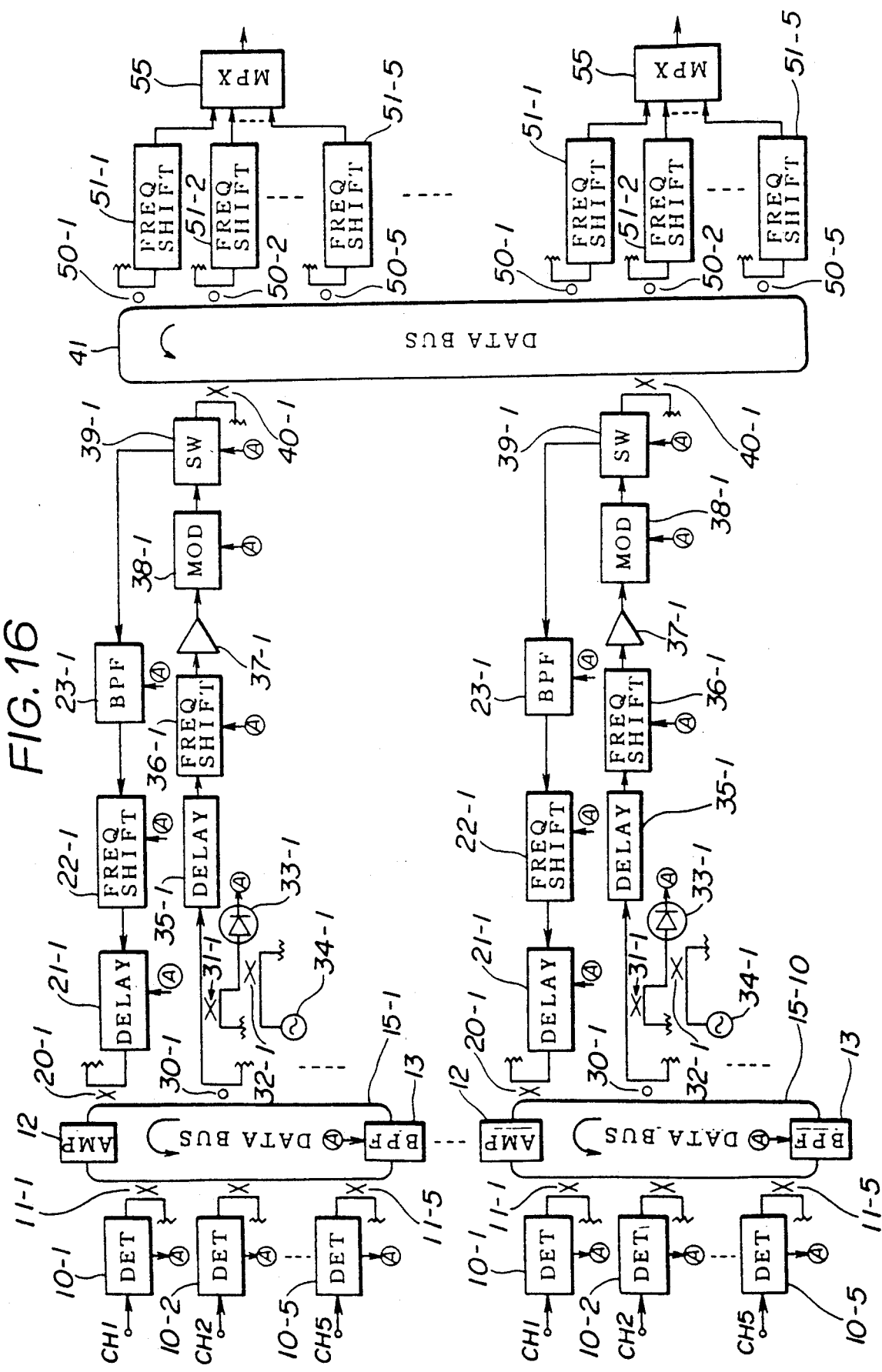
FIG. 16 is a system block diagram showing the second embodiment in more detail.

When a priority $p$ of the optical signal supplied to the optical switch 39-1 is low and an optical signal having a higher priority $p$ exists in another channel in FIG. 16, the optical switch 39-1 is switched to output the optical signal from the optical modulator 38-1 to a feedback loop so as to supply the optical signal to an optical bandpass filter 23-1. On the other hand, when a priority $p$ of the optical signal supplied to the optical switch 39-1 is high and an optical signal having a higher priority $p$ does not exist in another channel in FIG. 16, the optical switch 39-1 is switched to output the optical signal from the optical modulator 38-1 to an optical data bus 41 via a directional optical coupler 40-1.

When the optical switch 39-1 is switched to output the optical signal to the feedback loop, the optical bandpass filter 23-1 passes the wavelengths determined by the control information A. An output optical signal of the optical bandpass filter 23-1 is supplied to an optical frequency shifter 22-1 which shifts the wavelength of the optical signal a predetermined shift quantity determined by the control information A. The optical frequency shifter 22-1 may be constructed similarly to the optical frequency shifter 36-1. An output optical signal of the optical frequency shifter 22-1 is delayed a predetermined time (for example, $10^{-2}$ ms) in an optical delay circuit 21-1 responsive to the control information A and is supplied to the optical data bus 15-1 via a directional optical coupler 20-1. The optical signal supplied to the optical data bus 15-1 is transferred in the predetermined direction and is supplied to the directional optical coupler 31-1 via the directional optical bandpass filter 30-1 when the optical signal reaches the directional optical bandpass filter 30-1. The above described operation is repeated until the optical switch 39-1 is switched to output the optical signal from the optical modulator 38-1 to the optical data bus 41.

Next, the optical signal, which is obtained from the optical switch 39-1 and is supplied to the optical data bus 41 via the directional optical coupler 40-1, is transferred in a predetermined direction within the optical data bus 41. In this embodiment, the optical data bus 41 has a loop shape. When the optical signal transferred within the optical data bus 41 reaches a directional optical bandpass filter 50 which passes the wavelength $\lambda_1$, for example, the optical signal is supplied to an optical frequency shifter 51-1 via the directional optical bandpass filter 50-1. The optical frequency shifter 51-1 shifts the wavelength of the optical signal back into the original wavelength. An output optical signal of the optical frequency shifter 51-1 is supplied to an optical multiplexer 55 together with output optical signals of other optical frequency shifters 51-2 through 51-5. And a wavelength-division multiplexed and time-division multiplexed optical signal is output from the optical multiplexer 55 and supplied to an optical amplifier (not shown) via an optical fiber, for example.

Operations similar to that described above are carried out with respect to the wavelength-division multiplexed and time-division multiplexed signal which is received at the other channels CH2 through CH5.

As a result, the input optical signal which has the time, space and wavelength thereof controlled and multiplexed, is output from the optical switching system with a format which is substantially the same at the time when the input optical signal is supplied to the optical switching system.

In the described embodiments, the optical data bus has the loop shape. However, it is not essential that the optical data bus have the loop shape.

According to the present invention, the rules of frequency conversion are as follows. For the sake of convenience, an optical packet routing information within the header H is denoted by (a, b, c), and it is assumed that an optical packet signal having a frequency X is converted into an optical packet signal having a frequency "abc". Here, a denotes a number of output optical fibers (number of output highways), b denotes an output optical frequency (output highway freqency), and c denotes an output time slot (output highway time slot). The optical frequencies of all the optical packet signals are converted depending on the optical packet routing information (a, b, c), and the converted optical frequencies are sequentially arranged depending on the values of "abc" as shown in the following Table 2. Table 2 shows the optical packet arrangement in the optical data bus.

TABLE 2

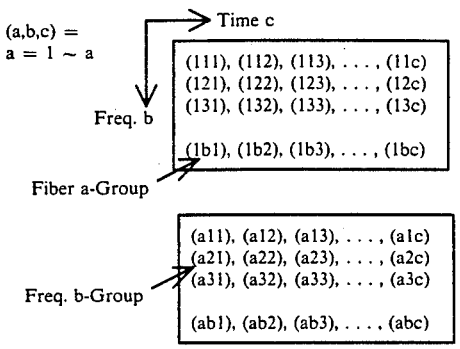

The same output highway signals (packets) have the same first digit as "a##" in the optical data bus (800 and 80, for example). The group is named the a-group as shown in the Table 2. In the a-group, the packets of the same output highway frequency have the same first two digits as "ab#" and this group is named the b-group.

Further, the present invention is not limited to these embodiments, but various variations and modifications may be made without departing from the scope of the present invention.

What is claimed is

1. An optical switching system comprising:
   first means for receiving an optical signal which is wavelength-division multiplexed and time-division multiplexed signal, said input optical signal including cells having a fixed length and a header which includes routing information, said routing information comprising a number a of output optical fibers, an optical frequency b and an output time slot c, said first means including:
   frequency dividing means for demultiplexing said input optical signal into optical signals respectively having a single frequency; and
   detector means for detecting control information included in said optical signals and for outputting time-division multiplexed signals;
   second means coupled to said first means for sequentially storing the time-division multiplexed signals output from said detector means and for reading out stored time-division multiplexed signals depending on the control information detected by said detector means, for carrying out a time slot interchange, for converting the wavelengths of all the stored optical signals depending on values of said routing information (a, b, c), and for converting optical frequencies of all the stored optical signals to an optical frequency abc;
   third means coupled to said second means for multiplexing wavelengths of time-division multiplexed signals output from said second means into wavelength-division multiplexed optical signals and for delaying a phase of the wavelength-division multiplexed optical signals by a predetermined quantity;
   an optical data bus coupled to said third means for receiving optical signals output from said third means and for transferring the optical signals in a predetermined direction within said optical data bus;

fourth means coupled to said optical data bus for extracting optical signals having wavelengths belonging to predetermined wave length regions from said optical data bus and delaying a phase of the extracted optical signals a predetermined quantity and for converting wavelengths of the extracted optical signals into predetermined wavelengths; and fifth means coupled to said fourth means and having an output side connected to the output optical fibers for multiplexing the wavelengths of the optical signals output from said fourth means so as to output an optical signal which is a wavelength-division multiplexed and time-division multiplexed signal.

2. An optical switching system comprising:

first means for receiving an input optical signal which is a wavelength-division multiplexed and time-division multiplexed signal, said first means including;
  frequency dividing means for demultiplexing said input optical signal into optical signals respectively having a single frequency; and
  detector means for detecting control information included in said optical signals and for outputting time-division multiplexed signals;

second means coupled to said first means for sequentially storing the time-division multiplexed signals output from said detector means and for reading out stored time-division multiplexed signals depending on the control information detected by said detector means, so as to carry out a time slot interchange and convert wavelengths of the time-division multiplexed signals into predetermined wavelengths;

third means coupled to said second means for multiplexing wavelengths of time-division multiplexed signals output from said second means into wavelength-division multiplexed optical signals and for delaying a phase of the wavelength-division multiplexed optical signals by a predetermined quantity;

an optical data bus coupled to said third means for receiving optical signals output from said third means and for transferring the optical signals in a predetermined direction within said optical data bus;

fourth means coupled to said optical data bus for extracting optical signals having wavelengths belonging to predetermined wavelength regions from said optical data bus and delaying a phase of the extracted optical signals a predetermined quantity and for converting wavelengths of the extracted optical signals into predetermined wavelengths; and fifth means coupled to said fourth means for multiplexing the wavelengths of the optical signals output from said fourth means so as to output an output optical signal which is a wavelength-division multiplexed and time-division multiplexed signal.

3. The optical switching system as claimed in claim 2, wherein said second means for each optical signal output from said first means, comprises:
  a separator for separating each of the time-division multiplexed signals output from said first means into a plurality of identical time-division multiplexed signals in optical packets by a branching;
  optical memories for storing the time-division multiplexed signals or optical packets output from said separator during mutually different time slots; and
  a frequency shifter for converting the wavelengths of the optical signals, which are read out from said optical memories based on said control information, into the predetermined wavelengths.

4. The optical switching system as claimed in claim 2, wherein said third means comprises:
  a wavelength multiplexer for multiplexing the optical signals output from said second means into a wavelength-division multiplexed optical signal; and
  an optical delay circuit for delaying the phase of the wavelength-division multiplexed optical signal by the predetermined quantity.

5. The optical switching system as claimed in claim 4, wherein said third means further comprises an optical coupler for optically coupling said optical delay circuit to said optical data bus for each wavelength-division multiplexed optical signal output from said optical delay circuit.

6. The optical switching system as claimed in claim 2, wherein said optical data bus comprises a loop shaped optical fiber.

7. The optical switching system as claimed in claim 2, wherein said fourth means comprises an optical bandpass filter for extracting the optical signals having the wavelengths belonging to the predetermined wavelength regions from said optical data bus.

8. The optical switching system as claimed in claim 7, wherein said fourth means further comprises:
  an optical delay circuit for delaying the phase of the extracted optical signals by the predetermined quantity; and
  a frequency shifter for converting the wavelengths of the extracted optical signals output from said optical delay circuit into the predetermined wavelengths.

9. The optical switching system as claimed in claim 2 wherein said control information contains at least an information selected from a group including a wavelength information of the optical input signal, a content information, a wavelength information of the optical output signal, an output channel information, an information quantity, a priority information, and a time slot information.

10. The optical switching system as claimed in claim 2 wherein said input optical signal is made up of cells having a fixed length and a header which includes a routing information, said routing information comprising a number a of output optical fibers which are coupled to an output side of said fifth means, an optical frequency b and an output time slot c.

11. The optical switching system as claimed in claim 10 wherein said second means converts the wavelengths of all the stored optical signals depending on values of the routing information (a, b, c).

12. The optical switching system as claimed in claim 11 wherein said second means converts optical frequencies of all the stored optical signals to an optical frequency abc.

13. The optical switching system as claimed in claim 2 wherein said first through fifth means process optical signals by an all-optical processing.

14. An optical switching system comprising:
  a plurality of detecting means for receiving an input optical signal which is a wavelength-division multiplexed signal and for detecting a control information included in the input optical signal;

a plurality of first optical buses, coupled to said detecting means, for transferring optical signals output from said detecting means in a predetermined direction within respective ones of said first optical data buses;

a plurality of optical bandpass filters, coupled to each of said first optical data buses, for extracting optical signals in predetermined wavelength regions based on said control information;

control information detecting means, coupled to said optical bandpass filters, for detecting a control information included in the optical signals output from said optical bandpass filters;

first shift means, coupled to said optical bandpass filters, for delaying phases of the optical signals output from said optical bandpass filters by a predetermined quantity and for shifting wavelengths of the optical signals a predetermined quantity determined by the control information output from said control information detecting means;

switching means, coupled to said first shift means, for outputting the optical signals output from said first shift means to one of a first path and a second path responsive to the control information output from said control information detecting means;

a second optical data bus, coupled to the first path of said switching means, for transferring the optical signals output from said switching means in a predetermined direction within said second optical data;

shift and delay means, coupled to the second path of said switching means, for receiving predetermined wavelength components of the optical signals output from said switching means determined by the control information output from said control information detecting means and for shifting wavelengths and delaying the predetermined wavelength components, said shift and delay means outputting optical signals corresponding to the shifted and delayed predetermined wavelength components to the respective first optical data buses;

second shift means, coupled to said second optical data bus, for extracting optical signals having wavelengths belonging to predetermined wavelength regions from said second optical data bus and for shifting wavelengths of the extracted optical signals a predetermined quantity determined by the control information output from said control information detecting means; and multiplexing means coupled to said second shift means for multiplexing the wavelengths of the optical signals output from said fourth means so as to output an output optical signal which is wavelength-division multiplexed.

15. The optical switching system as claimed in claim 14, wherein said detecting means includes an optical coupler which optically couples said detecting means to a corresponding one of said first optical data buses.

16. The optical switching system as claimed in claim 14, wherein said first optical data buses respectively comprise a loop shaped optical fiber.

17. The optical switching system as claimed in claim 16, wherein said first optical data buses respectively have an optical bandpass filter inserted at a predetermined position of the loop.

18. The optical switching system as claimed in claim 16, wherein said first optical data buses respectively have an optical amplifier inserted at a predetermined position of the loop.

19. The optical switching system as claimed in claim 14, wherein said second optical data bus comprises a loop shaped optical fiber.

20. The optical switching system as claimed in claim 14, wherein said switching means includes an optical coupler which optically couples said switching means to said second optical data bus.

21. The optical switching system as claimed in claim 14, wherein said shift and delay means includes an optical coupler which optically couples said shift and delay means to a corresponding one of said first optical data buses.

22. The optical switching system as claimed in claim 14, wherein said second shift means includes a plurality of optical bandpass filters having mutually different passbands coupled to said second optical data bus.

23. The optical switching system as claimed in claim 14, wherein said input optical signal is made up of cells having a fixed length and a header which includes a routing information, said routing information comprising a number a of output optical fibers which are coupled to an output side of said fifth means, an optical frequency b and an output time slot c.

24. The optical switching system as claimed in claim 23, wherein said first shift means converts the wavelengths of all the stored optical signals depending on values of the routing information (a, b, c).

25. The optical switching system as claimed in claim 24, wherein said first shift means converts optical frequencies of all the stored optical signals to an optical frequency abc.

26. The optical switching system as claimed in claim 14, wherein said detecting means, said optical bandpass filters, said control information detecting means, said first shift means, said shift and delay means, said second shift means and said multiplexing means process optical signals by an all-optical processing.

27. The optical switching system as claimed in claim 14, wherein said control information contains at least an information selected from a group including a wavelength information of the optical input signal, a content information, a wavelength information of the optical output signal, an output channel information, an information quantity, a priority information, and a time slot information.

28. An optical switching system comprising:

first means for receiving an input optical signal which is a wavelength-division multiplexed and time-division multiplexed signal, said first means including:

frequency dividing means for demultiplexing said input optical signal into optical signals respectively having a single frequency; and detector means for detecting control information included in said optical signals and for outputting time-division multiplexed signals;

second means coupled to said first means for sequentially storing the time-division multiplexed signals output from said detector means and for reading out stored time-division multiplexed signals depending on the control information detected by said detector means, so as to carry out a time slot interchange and convert wavelengths of the time-division multiplexed signals into predetermined wavelengths, said second means including:

a separator for separating each of the time-division multiplexed signals output from said first means into a plurality of identical time-division multiplexed signals in optical packets by branching;

optical memories for storing the time-division multiplexed signals or optical packets output from said separator during mutually different time slots; and a frequency shifter for converting the wavelengths of the optical signals, which are read out from said optical memories based on said control information, into the predetermined wavelengths;

third means coupled to said second means for multiplexing wavelengths of time-division multiplexed signals output from said second means into wavelength-division multiplexed optical signals and for delaying a phase of the wavelength-division multiplexed optical signals by a predetermined quantity;

an optical data bus coupled to said third means for receiving optical signals output from said third means and for transferring the optical signals in a predetermined direction within said optical data bus;

fourth means coupled to said optical data bus for extracting optical signals having wavelengths belonging to predetermined wavelengths regions from said optical data bus and delaying a phase of the extracted optical signals a predetermined quantity and for converting wavelengths of the extracted optical signals into predetermined wavelengths; and fifth means coupled to said fourth means for multiplexing the wavelengths of the optical signals output from said fourth means so as to output an output optical signal which is a wavelength-division multiplexed and time-division multiplexed signal.

29. The optical switching system as claimed in claim 28, wherein said optical data bus comprises a loop shaped optical fiber.

* * * * *

UNITED STATES PATENT AND TRADEMARK OFFICE
CERTIFICATE OF CORRECTION

PATENT NO. : 5,023,863
DATED : JUNE 11, 1991
INVENTOR(S) : SHIGEFUMI MASUDA

It is certified that error appears in the above-identified patent and that said Letters Patent is hereby corrected as shown below:

Col. 1, line 31, "k optical where" should be --k optical T-switches 2, where--.

Col. 3, line 44, "as s still" should be --as a still--.

Col. 10, line 1, "FIG.15A more" should be --FIG. 15. A more--.

Signed and Sealed this

Thirteenth Day of October, 1992

Attest:

DOUGLAS B. COMER

*Attesting Officer*  *Acting Commissioner of Patents and Trademarks*